United States Patent
Porter et al.

(10) Patent No.: US 10,860,347 B1
(45) Date of Patent: Dec. 8, 2020

(54) VIRTUAL MACHINE WITH MULTIPLE CONTENT PROCESSES

(71) Applicant: Amazon Technologies, Inc., Seattle, WA (US)

(72) Inventors: Richard Franklin Porter, Seattle, WA (US); Aleksey A. Polesskiy, Seattle, WA (US); Hok Peng Leung, Redmond, WA (US); Geoffrey Scott Pare, Seattle, WA (US); Christopher David Byskal, Issaquah, WA (US); Alexis Levasseur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 15/194,520

(22) Filed: Jun. 27, 2016

(51) Int. Cl.
*G06F 9/455* (2018.01)
*A63F 13/25* (2014.01)

(52) U.S. Cl.
CPC .......... *G06F 9/45508* (2013.01); *A63F 13/25* (2014.09); *G06F 9/45558* (2013.01); *G06F 2009/45575* (2013.01)

(58) Field of Classification Search
CPC ............ G06F 9/45508; G06F 9/45558; G06F 2009/45575; A63F 13/25
USPC .......................................................... 718/1
See application file for complete search history.

(56) References Cited

U.S. PATENT DOCUMENTS

| | | | |
|---|---|---|---|
| 6,081,846 A | 6/2000 | Hyder et al. | |
| 8,523,663 B2 | 9/2013 | Gagner et al. | |
| 8,556,724 B2 | 10/2013 | Dale et al. | |
| 9,069,477 B1 | 6/2015 | Overton | |
| 9,588,885 B1 | 3/2017 | Ganta et al. | |
| 9,594,586 B2 * | 3/2017 | Shigeta | G06F 9/45558 |
| 9,647,909 B2 | 5/2017 | Kuan et al. | |
| 9,799,094 B1 | 10/2017 | Chen et al. | |
| 2005/0055399 A1 | 3/2005 | Savchuk | |
| 2006/0271205 A1 * | 11/2006 | Abe | G06F 11/0715 700/9 |
| 2007/0143738 A1 | 6/2007 | Baker et al. | |
| 2009/0007115 A1 | 1/2009 | Sun et al. | |

(Continued)

OTHER PUBLICATIONS

U.S. Appl. No. 15/194,508, filed Jun. 27, 2016, Porter et al.
U.S. Appl. No. 15/194,498, filed Jun. 27, 2016, Porter et al.

*Primary Examiner* — Meng AI T An
*Assistant Examiner* — Willy W Huaracha
(74) *Attorney, Agent, or Firm* — BakerHostetler

(57) ABSTRACT

Techniques for concurrent execution of multiple content item processes, such as video game processes, on a single virtual machine instance are described herein. In some examples, developers may provide an indication of a desired content item process quantity count, which is a quantity of content item processes for concurrent execution of content item sessions on each of one or more virtual machine instances. Also, in some examples, the content item process quantity count may be adjustable such that it may be changed, for example in response to various conditions or events. Also, in some cases, collected performance metric information may be used to make intelligent decisions regarding scaling of content item processes. In some examples, when a content item session stops executing on a healthy content item process, the content item process may remain active and may be reused by executing one or more subsequent content item sessions.

10 Claims, 12 Drawing Sheets

Example Performance Metric Information 210

| Health Information 211 | Premature Stoppage (e.g., Crash) Information 212 | Processor Usage Information 213 | Memory Usage Information 214 | I/O Information 215 | User Quantity Information 216 | Session Duration Information 217 | Map / Virtual Location Information 218 | Other Information 219 |

(56) References Cited

U.S. PATENT DOCUMENTS

| | | |
|---|---|---|
| 2009/0156303 A1 | 6/2009 | Kiely et al. |
| 2009/0254572 A1 | 10/2009 | Redlich et al. |
| 2009/0318235 A1 | 12/2009 | Ashida et al. |
| 2010/0115022 A1 | 5/2010 | Rapo |
| 2010/0146085 A1 | 6/2010 | Wie et al. |
| 2010/0304860 A1 | 12/2010 | Gault et al. |
| 2010/0332658 A1 | 12/2010 | Elyashev |
| 2012/0102185 A1 | 4/2012 | Fernandes |
| 2012/0166645 A1 | 6/2012 | Boldyrev et al. |
| 2012/0208636 A1 | 8/2012 | Feige |
| 2012/0233624 A1* | 9/2012 | Niimura ............... G06F 9/485 718/103 |
| 2013/0152047 A1 | 6/2013 | Moorthi et al. |
| 2014/0228108 A1* | 8/2014 | Bruno, Jr. ............. G06F 12/00 463/29 |
| 2014/0342819 A1 | 11/2014 | Bruno, Jr. et al. |
| 2014/0344457 A1* | 11/2014 | Bruno, Jr. ............. A63F 13/12 709/226 |
| 2015/0050998 A1 | 2/2015 | Stelovsky et al. |
| 2015/0121250 A1 | 4/2015 | Waxman et al. |
| 2015/0363117 A1 | 12/2015 | Manpathak et al. |
| 2016/0029218 A1 | 1/2016 | Otiato et al. |
| 2016/0296842 A1 | 10/2016 | Kamiyama |
| 2016/0371433 A1 | 12/2016 | Polesskiy et al. |
| 2016/0378552 A1 | 12/2016 | Taylor et al. |
| 2017/0165572 A1* | 6/2017 | Perry ..................... H04N 19/42 |
| 2018/0126279 A1 | 5/2018 | Stelovsky et al. |

\* cited by examiner

VIRTUAL MACHINE WITH MULTIPLE CONTENT PROCESSES

BACKGROUND

The use of electronically presented content items, such as video games, is becoming increasingly popular. In some examples, video game developers may pay a fee to have their games hosted by a computing service provider, which executes the games and makes the games available to players that connect to the computing service provider's systems. Video games may often be installed on large numbers of virtual machine instances that are operated by the computing service provider. One limitation of certain computing service provider systems is that only a single game process may be executed on each virtual machine instance at any given time. This may result in wasted resources, such as wasted processing, memory, and other resources that may be available to a virtual machine instance but that are not fully used by the single game process that executes on the virtual machine instance. These inefficiencies may result in higher expenses for developers to operate their games and higher costs for players to access and participate in the games.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
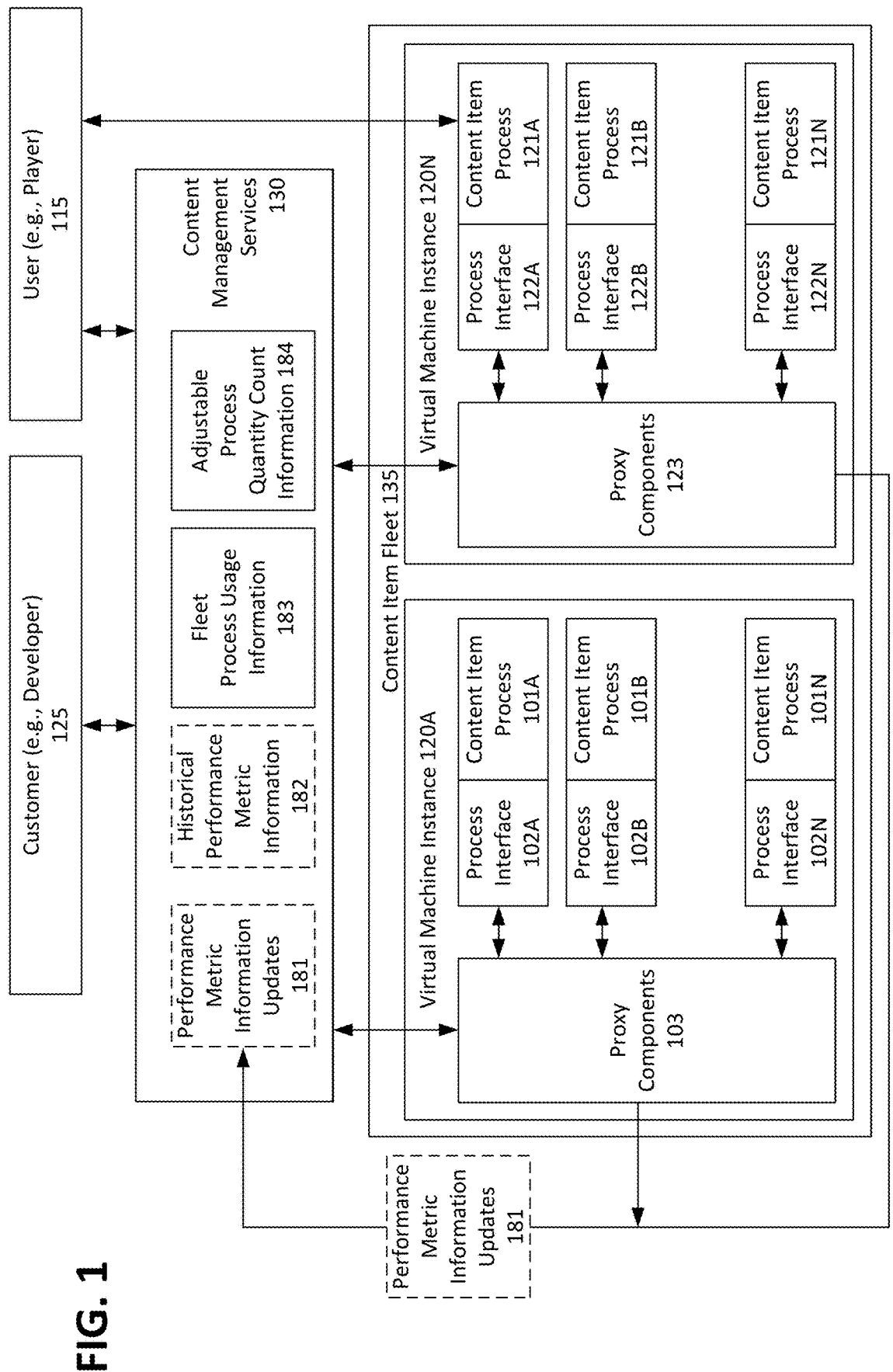
FIG. 1 is a diagram illustrating an example content execution system with multiple content item process per virtual machine instance that may be used in accordance with the present disclosure.

Techniques for concurrent execution of multiple content item processes, such as processes that may be used for running and hosting video games, on a single virtual machine instance are described herein. A content item process is an instance of a computer program that is executed for hosting of content, such as a video game session. The content item process includes program code and a current respective state. A content item process may, for example, be made up of multiple threads of execution. In some examples, each content item process may be operable to execute a respective content item session to which one or more player or other user sessions may be connected. By operating multiple content item processes on a single virtual machine instance, resources associated with the virtual machine instance may be used more efficiently, such as by reducing wasted resources that are not used by systems that limit virtual machine instances to executing only a single content item instance. In some examples, these may include resources such as processing resources, memory resources, communications (e.g., input/output (I/O)) resources, and other resources associated with a virtual machine instance. More efficient use of these resources may, for example, reduce expenses for developers and other customers of a computing service provider that may host the content items on behalf of the customers. Additionally, more efficient use of these resources may also reduce costs and improve satisfaction for players and other users of the content items.

In some examples, developers may provide an indication of a desired content item process quantity count, which is a quantity of content item processes for concurrent execution of content item sessions on each of one or more virtual machine instances. Also, in some examples, the content item process quantity count may be adjustable such that it may be changed, for example in response to various conditions or events. In some cases, the content item process quantity count may be received and stored by a content item management service, which may be periodically polled by the virtual machine instances. When the content item process quantity count is increased, one or more virtual machine instances may launch additional content item processes until they are eventually in compliance with the increased content item process quantity count. By contrast, when the content item process quantity count is decreased, the virtual machine instance may also attempt to comply with the decreased content item process quantity count. In some examples, however, the virtual machine instances may not terminate or kill existing content item processes in order to comply with the decreased content item process quantity count. Rather, a virtual machine instance may instead wait until one or more existing content item processes stop executing and may then not relaunch those processes until the virtual machine instance is eventually in compliance with the decreased content item process quantity count.

In some cases, information associated with one or more performance metrics may be collected in relation to one or more content item processes and/or virtual machine instances. This performance metric information may include, for example, processing usage information, memory usage information, I/O and other communications information, process health information, process premature stoppage (e.g., crash) information, user quantity information, session duration, map and other virtual location information, time and date information, and other information. The collected performance metric information may be used, for example, to make intelligent decisions regarding scaling of content item processes. For example, in some cases, the performance metric information may indicate that one or more content item processes are frequently unhealthy or crashing or are consuming resources at or above one or more upper thresholds. In some examples, this may cause the process quantity count for those virtual machine instances to be decreased or may otherwise cause the quantity of processes executing on those virtual machine instances to be decreased. By contrast, in some cases, the performance metric information may indicate that one or more one or more content item processes are consuming resources at or below one or more lower thresholds. In some examples, this may cause the process quantity count for those virtual machine instances to be increased or may otherwise cause the quantity of processes executing on those virtual machine instances to be increased. It is noted that, in some examples, a content item process quantity count need not necessarily be provided by a developer or other party, and a quantity of content processes to execute on one or more virtual machine instances may instead be determined automatically for the developer, for example based on performance metric or other information. Also, in some examples, a hybrid technique may be employed, for example in which a developer may provide a content item process quantity count, but the content item process quantity count may be automatically adjusted or overridden based on certain performance metric or other information.

Each virtual machine instance may, in some examples, launch multiple process monitoring components, for example for monitoring health and other performance metrics associated with the multiple content item processes executing the virtual machine instance. For example, in some cases, each content item process may be required to periodically confirm its health or otherwise contact its respective process monitoring component. In some examples, if a content item process fails to contact its process monitoring component within one or more time periods, the content item process may be considered unhealthy and may be terminated. Also, in some examples, when a content item session that executes on a particular content item process has stopped execution, a determination may be made as to whether the content item process is healthy. If the content item process is unhealthy, the content item process may be terminated. By contrast, if the content item process is healthy, then the content item process may remain active and may be reused by executing one or more subsequent content item sessions. By reusing healthy content item processes, at least part of content item data that was loaded for use with a prior content item session may be reused for subsequent content item sessions without having to be reloaded. This reused content item data may include, for example, map or other virtual location data, game asset data, character data, and other content item data. This may reduce the wait time required for launching of the subsequent content item session. Additionally, by terminating unhealthy content item processes, the system may improve reliability and user experiences by identifying and resolving potential problems.

FIG. 1 is a diagram illustrating an example content execution system with multiple content item process per virtual machine instance that may be used in accordance with the present disclosure. As shown in FIG. 1, a content item fleet 135 may be executed on behalf of a developer or other customer 125, for example by a computing service provider. The content items included in content item fleet 135 may include for example, video games and other media items, office and productivity items, and other applications or items of content. The content item fleet 135 may be executed using virtual machine instances 120A-N. As should be appreciated, although only two virtual machine instances 120A-N are shown in FIG. 1, a content item fleet may include any quantity of virtual machine instances and may, for example, be adjusted in quantity based on user demand and other factors. Virtual machine instances 120A-N may each execute a number of content item processes 101A-N and 121A-N, respectively. As should also be appreciated, although three content item processes are shown on each virtual machine instance in FIG. 1, a virtual machine instance may execute any quantity of content item processes, which may be selected and adjusted based on factors such as will be described in detail below. In some examples, each content item process 101A-N and 121A-N may be operable to execute a respective content item session, such as a video game session, to which one or more players or other users 115 may be connected, such as will be described in detail below with reference to FIGS. 2 and 3. As will be described in greater detail below, in some examples, a virtual machine instance 120 may periodically communicate with content management services 130, for example for configuration information such as a quantity of content item process to execute on the virtual machine instance 120. When the virtual machine instance 120 is executing fewer than the specified quantity of content item processes, the virtual machine instance 120 may, in some examples, launch additional content item processes. Also, in some examples, when the virtual machine instance 120 is executing the same or more than the specified quantity of content item processes, existing content item processes that stop executing may not be relaunched on the virtual machine instance 120.

As shown in FIG. 1, each virtual machine instance 120A and 120N includes proxy components 103 and 123, respectively. Proxy components 103 and 123 may generally perform operations relating to managing various components on virtual machine instances 120A and 120N and communicating with components both within and external to virtual machine instances 120A and 120N. In the example of FIG. 1, proxy components 103 and 123 may communicate with content management services 130, which may generally perform operations related to management of content item fleet 135. It is noted that, in some examples, content management services 130 may represent a combination of a number of different underlying services, such as scaling services, information services, and other interfaces and services.

Content management services 130 may store or otherwise provide access to adjustable process quantity count information 184, which include information relating to content item process quantity counts for virtual machine instances 120A and 120N. A content item process quantity count is a quantity of content item processes that are indicated for concurrent execution of content item sessions on virtual machine instances 120A and 120N. In some examples, a single process quantity count may be indicated and applied to each of a group of multiple virtual machine instances, such as all virtual machine instances in the content item fleet 135 or a subset of the virtual machine instances in the content item fleet 135. Also, in some examples, different process quantity counts may be indicated for each individual virtual machine instance in the content item fleet 135. In some examples, the content item process quantity counts may be provided by a developer, for example based on testing of the content item. In one particular example, a content item may be tested by gradually increasing the content item process quantity count until an undesirably high frequency of crashes, delays, errors, or other unhealthy behavior is detected. In one specific example, the content item process quantity count may be determined based on a highest tested process quantity count that did not result in unacceptable unhealthy behavior. Also, in some examples, one or more content item process quantity counts may be adjusted after deployment of the content item, for example based on various factors that will be described in detail below.

Each content item process 101A-N and 121A-N includes a respective process interface 102A-N and 122A-N. In some examples, each process interface 102A-N and 122A-N may be associated with and/or implemented using a software development kit (SDK) or other instructions associated with a computing service provider that operates the content item fleet 135. Each process interface 102A-N and 122A-N may generally assist in communications and other operations between a respective content item process and proxy components 103 and 123, for example for initiation and configuration of a content item process, and reporting of health information and other performance metrics associated with a content item process. For example, in some cases, various instructions associated with process interfaces 102A-N and 122A-N, such as one or more SDKs, may be exposed and/or provided to developers. These instructions may assist in enabling the content item processes 101A-N and 121A-N to perform the tasks described above and other tasks. The developers may, in turn, include, embed or otherwise associate these instructions with the content item that is made accessible for deployment.

Figure 2:
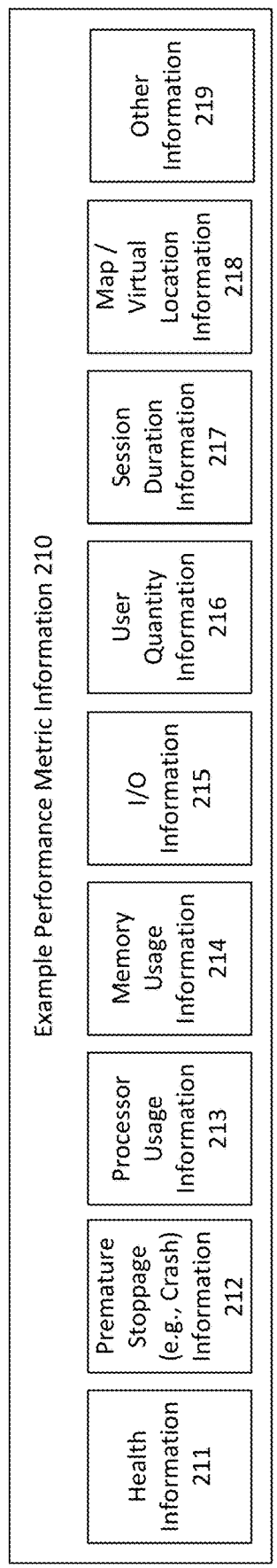
FIG. 2 is a diagram illustrating example performance metrics that may be used in accordance with the present disclosure.

In some cases, information associated with one or more performance metrics may be collected in relation to one or more content item processes and/or virtual machine instances. Referring now to FIG. 2, some example performance metric information will now be described in detail. As shown, example performance metric information 210 includes health information 211, premature stoppage (e.g., crash) information 212, processor usage information 213, memory usage information 214, I/O and other communications information 215, user quantity information 216, session duration information 217, map and other virtual location information 218, and other information 219 (e.g., time, date, physical location, and other information).

Referring back to FIG. 1, certain performance metric information may, in some examples, be periodically reported by process interfaces 102A-N and 122A-N to proxy components 103 and 123. Proxy components 103 and 123 may then periodically transmit performance metric information updates 181, which may be received and collected by content management services 130. Content management services 130 may, in turn, use the collected performance metric information updates 181 to update historical performance metric information 182. In some examples, performance metric information updates 181 and/or historical performance metric information 182 may be made available to a developer or other customer 125 and/or may be used by the computing service provider, for example to make intelligent determinations regarding content item fleet 135, such as will be described below.

In particular, in some examples, performance metric information 181 and/or 182 may be used to make intelligent decisions regarding scaling of content item processes. For example, in some cases, the performance metric information 181 and/or 182 may indicate that one or more content item processes are frequently unhealthy or crashing or are consuming resources at or above one or more upper thresholds. For example, in some cases, performance metric information updates 181 may indicate that content item processes that are currently executing on a virtual machine instance are using a large percentage of the processing, memory, I/O, and/or other resources available to the virtual machine instance. In some examples, this may cause the process quantity count for that virtual machine instance to be decreased or may otherwise cause the quantity of processes executing on those virtual machine instances to be decreased. Additionally, in some examples, other performance metric information may also cause the quantity of content item processes executing on a virtual machine to be decreased. For example, if performance metric information updates 181 indicate that larger than normal quantities of users are assigned to the content item process, then this may indicate that the processes are currently using and/or will soon be using large amounts of resources and their quantity should be decreased.

By contrast, in some cases, the performance metric information 181 and/or 182 may indicate that one or more content item processes are consuming resources at or below one or more lower thresholds. In some examples, this may cause the process quantity count for those virtual machine instances to be increased or may otherwise cause the quantity of processes executing on those virtual machine instances to be increased. For example, in some cases, performance metric information updates 181 may indicate that content item processes that are currently executing on a virtual machine instance are using only a small percentage of the processing, memory, I/O, and/or other resources available to a virtual machine. In some examples, this may cause the process quantity count for that virtual machine instance to be increased or may otherwise cause the quantity of processes executing on those virtual machine instances to be increased so as not to waste available resources. Additionally, in some examples, other performance metric information may also cause the quantity of content item processes executing on a virtual machine to be increased. For example, if performance metric information updates 181 indicate that smaller than normal quantities of users are assigned to the content item process, then this may indicate that the quantity should be increased.

Additionally, in some cases, the quantity of content item processes on a virtual machine instance may be adjusted based, at least in part, on historical performance metric information 182. For example, in some cases, historical performance metric information 182 may indicate that a certain content item may have certain elapsed game session durations, certain map or other virtual locations, and/or other attributes that correlate to usage of large amounts of processor, memory, and/or other resources. In some examples, when processes for this content item on a particular virtual machine instance report that they have one or more of these higher resource usage attributes, then the quantity of content item processes on that virtual machine instance may, in some cases, be decreased. By contrast, in some cases, historical performance metric information 182 may indicate that a certain content item may have certain elapsed game session durations, certain map or other virtual locations, and/or other attributes that correlate to usage of smaller amounts of processor, memory, and/or other resources. In some examples, when processes for this content item on a particular virtual machine instance report that that they have one or more of these lower resource usage attributes, then the quantity of content item processes on that virtual machine instance may, in some cases, be increased.

As also shown in FIG. 1, content management services 130 may also store or otherwise provide access to fleet process usage information 183, which may generally include usage information for content item processes 101A-N and 121A-N in the content item fleet 135. For example, in some cases, fleet process usage information 183 may include information regarding which content item processes 101A-N and 121A-N are currently executing a content item session and which content item processes 101A-N and 121A-N are not currently executing a content item session (and may, therefore, be available to initiate a new content item session). In some examples, this information may also be exposed to customer 125, for example to enable the customer to make intelligent decisions regarding scaling of virtual machine instances 120A-N in content item fleet 135. For example, if fleet process usage information 183 indicates that there are few, if any, available content item processes that are not currently executing any content item sessions, then this may indicate that the current content item fleet is at or near capacity and that it may be desirable to add additional virtual machines to the content item fleet. By contrast, if fleet process usage information 183 indicates that there are large quantities of available content item processes that are not currently executing any content item sessions, then this may indicate that the current content item fleet has unnecessarily large amounts of capacity and that it may be desirable to remove virtual machines from the content item fleet upon expiration of their currently executing content item sessions.

Figure 3:
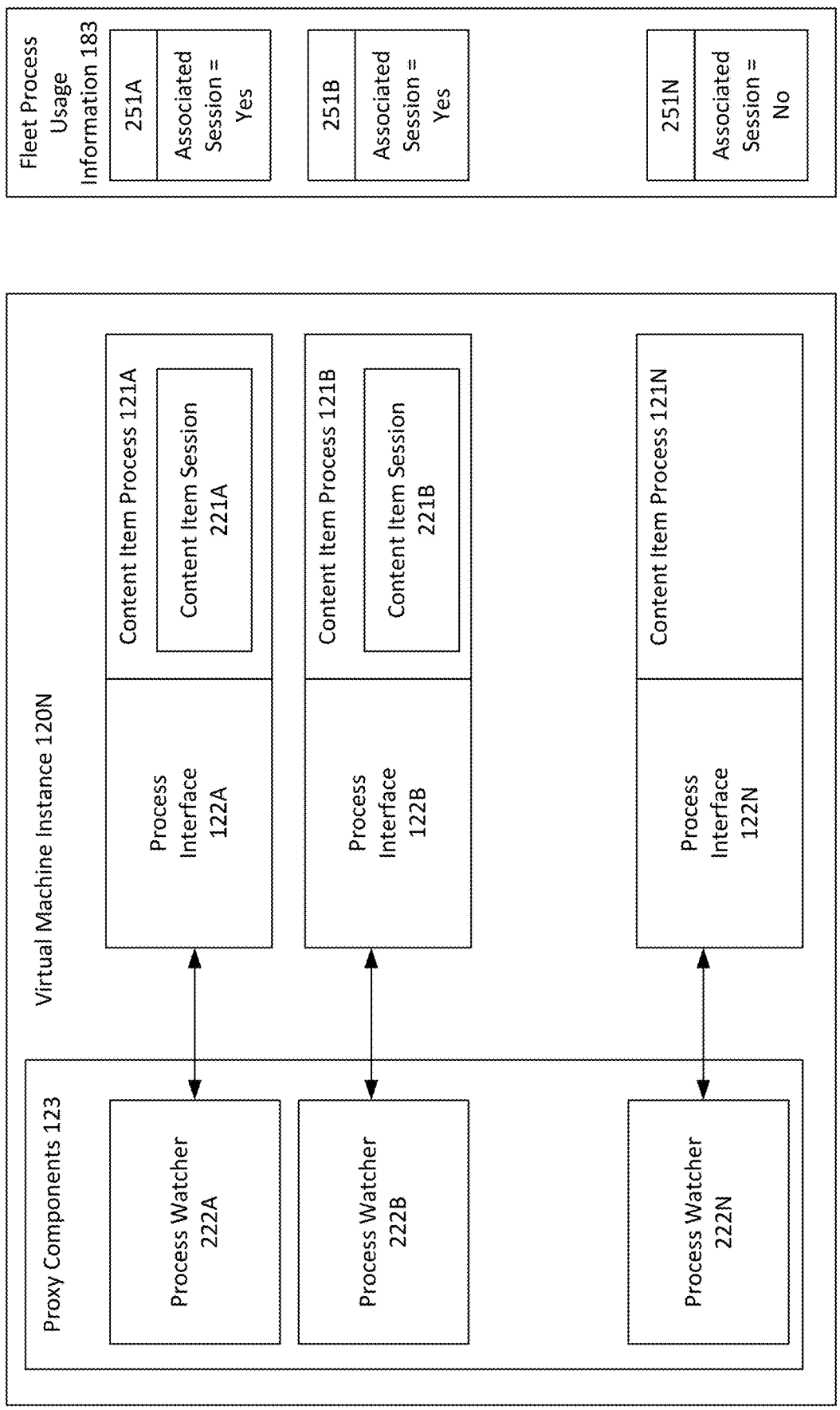
FIG. 3 is a diagram illustrating an example virtual machine instance with multiple content item processes and associated session information that may be used in accordance with the present disclosure.

Referring now to FIG. 3, some example components of virtual machine instance 120N will now be described in detail. As shown, proxy components 123 include process watchers 222A-N for monitoring each of content item processes 121A-N, respectively. Process watchers 222A-N may generally be responsible for performing various operations related to a respective content item process, such as launching of a respective process, reporting of the launched process, monitoring and reporting of health information and other performance metrics associated with a respective process, detecting a stoppage of execution of a respective content item process and/or content item session, and other operations. In some examples, a process interface 122A-N may create a socket connection with proxy components 123, and a uniform resource locator (URL) that is hit to establish the connection may include a process identifier for a respective content item process 121A-N in its query parameters. So, for example, a request may go to http://localhost:4747?pid=1234, and the 1234 identifier may be extracted to pair the connected process interface 122A-N with the process watcher 222A-N that monitors the respective process 121A-N.

When a content item process is launched and is ready to accept new content item sessions, this status may be reported to content management services 130 and stored in fleet process usage information 183. Additionally, when a content item session is launched on a content item process and the content item process is no longer available to accept new content item sessions, this status may also be reported to content management services 130 and stored in fleet process usage information 183. For example, as shown in FIG. 2, content item processes 121A and 121B are currently executing content item sessions 221A and 221B, respectively. By contrast, content item process 121N is not currently executing a respective content item session. This information is reflected in fleet process usage information 183, which includes entries 251A-N. In particular, entry 251A indicates that content item process 121A is executing a respective content item session. Additionally, entry 251B indicates that content item process 121B is executing a respective content item session. Furthermore, entry 251N indicates that content item process 121N is not currently executing a respective content item session.

Figure 4:
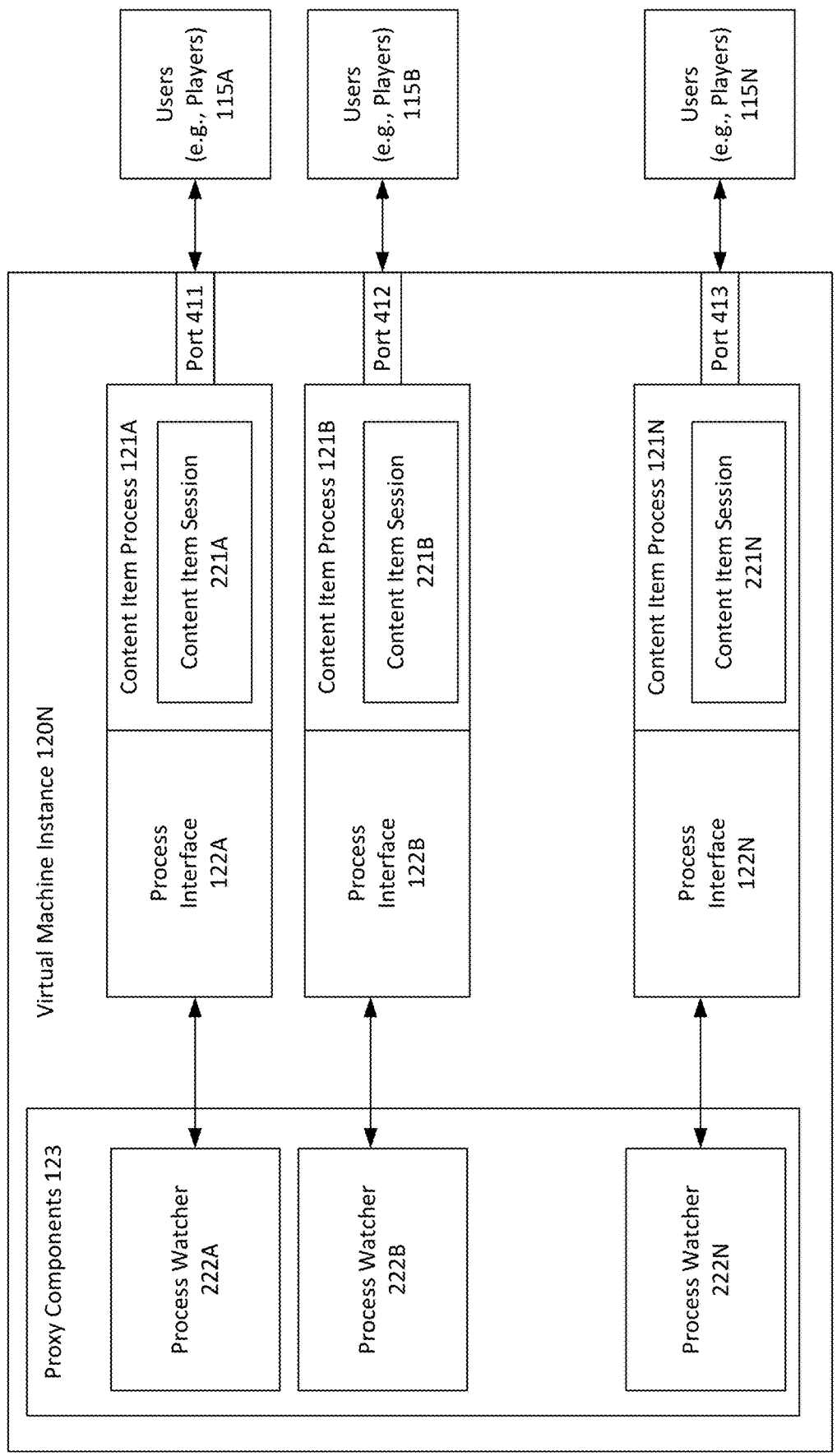
FIG. 4 is a diagram illustrating an example virtual machine instance with multiple content item processes and associated ports that may be used in accordance with the present disclosure.

Each content item process on a virtual machine instance may, in some examples, be assigned one or more associated ports for communications with players and other users that are assigned to the respective content processes. This may, for example, help to prevent collisions and ensure that communications between users and process are able to be efficiently sent and received in an organized and reliable manner. Referring now to FIG. 4, an example of content item process port assignment will now be described in detail. In particular, as shown in FIG. 4, each content item process 121A-N executes a respective content item session 221A-N. Content item process 121A communicates with respective users 115A using respective port 411. Additionally, content item process 121B communicates with respective users 115B using respective port 412. Furthermore, content item process 121N communicates with respective users 115N using respective port 413. In some examples, when a content item process is ready to accept content item sessions, the content item process may select its particular associated port. For example, a content item process may select its port by selecting a first available port from an ordered list, using a small network manager daemon that handles port selection, or using other techniques. Upon being selected, information about a selected port may be provided to content management service 130, which may, for example, provide instructions for communication between a content item process and its assigned users via the selected port.

In some cases, each content item process 121A-N may be required to periodically confirm its health or otherwise contact its respective process watcher 222A-N. In some examples, if a content item process 121A-N fails to contact its respective process watcher 222A-N within one or more time periods, the content item process may be considered unhealthy and may be terminated. Also, in some examples, the health status and/or premature stoppage (e.g., crashing) of a content item process 121A-N may be reported to content management services 130, for example for use in making content item process scaling determinations. Additionally, as will be described in detail below, the health of a content item process may also be used, for example, to make determinations regarding whether to reuse or terminate and relaunch (e.g., recycle) the content item process.

As set forth above, in some examples, developers may provide an indication of a desired content item process quantity count, which is a quantity of content item processes that are indicated for concurrent execution of content item sessions on each of one or more virtual machine instances. Also, in some examples, the content item process quantity count may be adjustable such that it may be changed, for example in response to performance metric information 181 and 182 and other events and conditions such as those described above. In some cases, the adjustable process quantity count information 184 may be received and stored by content management services 130, which may be periodically polled by the virtual machine instances 120A-N. When the content item process quantity count is increased, one or more virtual machine instances may launch additional content item processes until they are eventually in compliance with the increased content item process quantity count. By contrast, when the content item process quantity count is decreased, the virtual machine instance may also attempt to comply with the decreased content item process quantity count. In some examples, however, the virtual machine instances may not terminate or kill existing content item processes in order to comply with the decreased content item process quantity count. Rather, the virtual machine instances may instead wait until one or more existing content item processes stop executing and may then not relaunch those processes until they are eventually in compliance with the decreased content item process quantity count.

Figure 5:
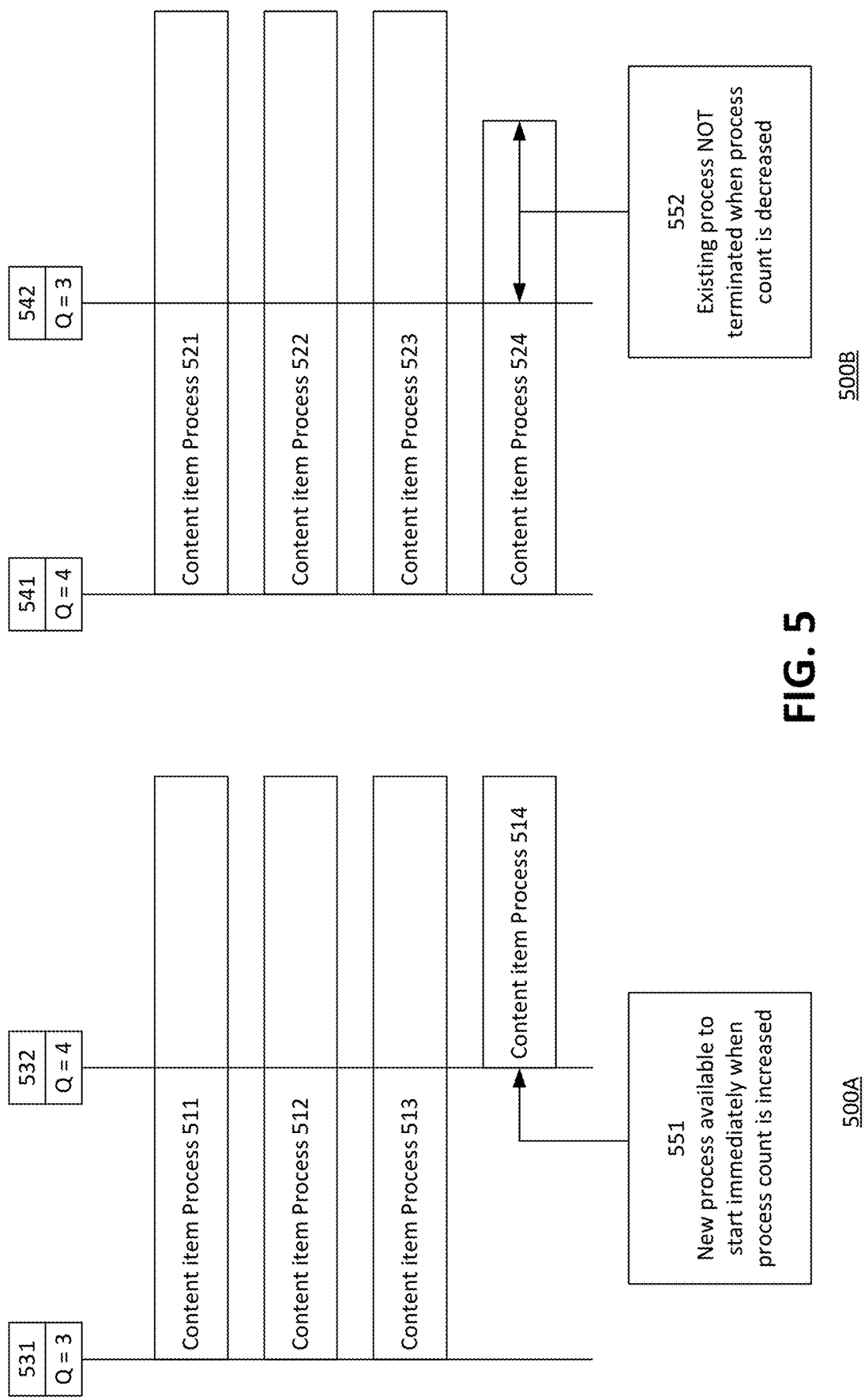
FIG. 5 is a diagram illustrating example content item process scaling determinations that may be used in accordance with the present disclosure.

Referring now to FIG. 5, some example content item process scaling determinations based, at least in part, on a content item process quantity count will now be described. In particular, a first example scaling determination 500A is shown on the left side of FIG. 5. As shown, in example determination 500A, a virtual machine instance polls adjustable process quantity count information 184 at a first time 531 to determine that the content item process quantity count is set to quantity of three (represented by the Q=3 designation below time 531). At time 531, the virtual machine instance is executing three content item processes 511, 512 and 513. At time 531, the quantity of processes being executed by the virtual machine instance (three) is equivalent to the content item process quantity count. Thus, subsequent to time 531, the virtual machine instance continues to execute three content item processes. However, at time 532, the content item process quantity count is increased from three to four. Accordingly, at time 532, the virtual machine instance promptly launches a new content item process 514 in order to be in compliance with the content item process quantity count of four. This is noted in description box 551, which indicates that a new process is available to start immediately (or almost immediately) when the process quantity count is increased. Upon being launched, the new content item process 514 may, in some examples, be used to host a new video game or other content item session. As set forth above, hosting of the new content item process 514 on the same virtual machine instance that hosts content item processes 511, 512 and 513 may improve efficiency by, for example, allowing resources of that virtual machine instance to be more fully utilized and also, for example, avoiding the need to launch an additional virtual machine instance in order to host the new content item process 514.

Additionally, a second example scaling determination 500B is shown on the right side of FIG. 5. As shown, in example determination 500B, a virtual machine instance polls adjustable process quantity count information 184 at a third time 541 to determine that the content item process quantity count is set to quantity of four (represented by the Q=4 designation below time 541). At time 541, the virtual machine instance is executing four content item processes 521, 522, 523 and 524. At time 541, the quantity of processes being executed by the virtual machine instance (four) is equivalent to the content item process quantity count. Thus, subsequent to time 541, the virtual machine instance continues to execute four content item processes. However, at time 542, the content item process quantity count is decreased from four to three. It is noted, however, that, at time 542, the virtual machine instance does not terminate any executing content item process in order to be in compliance with the decreased content item process quantity count. Rather, the virtual machine instance may instead wait for one of its executing content item processes to stop executing, and then may not re-launch the process. As shown, content item process 524 stops executing at a subsequent time after time 542. This is noted in description box 552, which indicates that an existing process is not terminated when the process quantity count is decreased. Rather, when content item process 524 eventually stops executing, the quantity of content item processes executing on the virtual machine instance will be reduced to three and will, at that point, be compliant with the content item process quantity count of three. Thus, the above described techniques may allow the user experience to be improved, for example by not unnaturally terminating content item processes, while at the same time eventually allowing compliance with the content item process quantity count.

Figure 6:
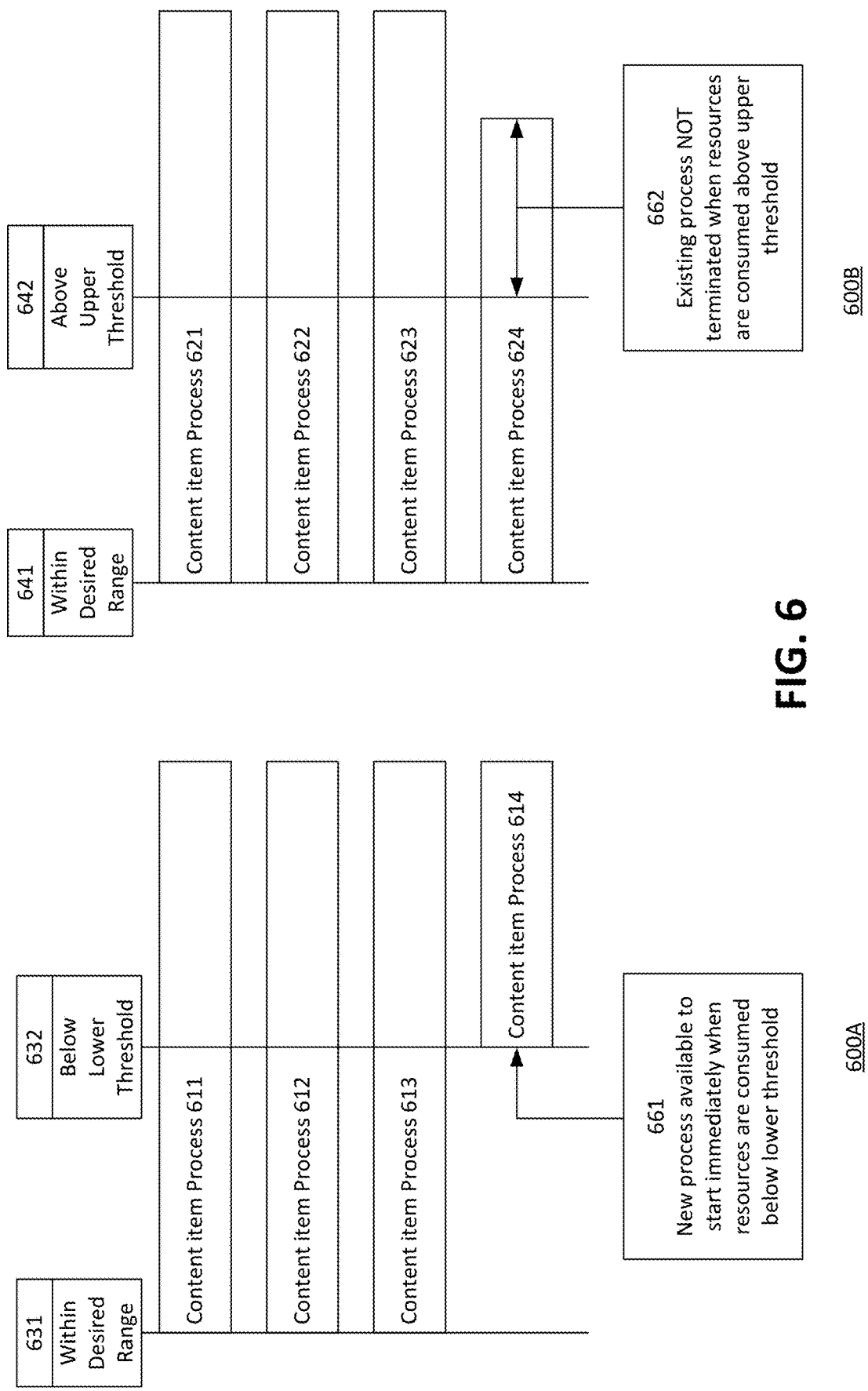
FIG. 6 is a diagram illustrating other example content item process scaling determinations that may be used in accordance with the present disclosure.

As set forth above, in some examples, a content item process quantity count need not necessarily be provided by a developer or other party, and a quantity of content processes to execute on one or more virtual machine instances may instead be determined automatically for the developer, for example based on performance metric information 181 and/or 182 of FIG. 1 or other information. Also, in some examples, a hybrid technique may be employed, for example in which a developer may provide a content item process quantity count, but the content item process quantity count may be automatically adjusted or overridden based on certain performance metric or other information. Referring now to FIG. 6, some example content item scaling determinations based, at least in part, on performance metric information will now be described in detail. In particular, a first example scaling determination 600A is shown on the left side of FIG. 6. As shown, in example determination 600A, at a time 631, there are three content item processes 611, 612 and 613 executing on a virtual machine instance. Additionally, at time 631, performance metric information is examined to determine that the content item processes 611-613 are executing within a desired performance range (represented by the "Within Desired Range" designation below time 631). For example, the content item processes 611-613 may be consuming processing, memory and/or other virtual machine instance resources at levels that are within desirable operational ranges. Thus, because the processes are operating within desired ranges, the virtual machine instance continues to execute three content item processes subsequent to time 631. However, at time 632, it is determined that content item processes 611-613 are consuming resources at levels that are below one or more lower thresholds (represented by the "Below Lower Threshold" designation below time 631). For example, the content item processes 611-613 may be consuming processing, memory and/or other virtual machine instance resources at levels that are below one or more lower thresholds, thereby indicating that the virtual machine instance may be capable of efficiently supporting additional content item processes. Accordingly, at time 632, the virtual machine instance promptly launches a new content item process 614 in order more efficiently use resources that are available to the virtual machine instance and might otherwise be wasted. This is noted in description box 661, which indicates that a new process is available to start immediately (or almost immediately) when virtual machine instance resources are being consumed below a lower threshold.

Additionally, a second example scaling determination 600B is shown on the right side of FIG. 6. As shown, in example determination 600B, at a time 641, there are four content item processes 621, 612, 623 and 614 executing on a virtual machine instance. Additionally, at time 641, performance metric information is examined to determine that the content item processes 621-624 are executing within a desired performance range. For example, the content item processes 621-624 may be consuming processing, memory and/or other virtual machine instance resources at levels that are within desirable operational ranges. Thus, because the processes are operating within desired ranges, the virtual machine instance continues to execute four content item processes subsequent to time 641. However, at time 642, it is determined that content item processes 621-624 are consuming resources at levels that are above one or more upper thresholds. For example, the content item processes 621-624 may be consuming processing, memory and/or other virtual machine instance resources at levels that are above one or more upper thresholds, thereby indicating that the virtual machine instance may be incapable of continuing to efficiently supporting all four content item processes 621-624. It is noted, however, that, at time 642, the virtual machine instance does not terminate any executing content item process. Rather, the virtual machine instance may instead wait for one of its executing content item processes to stop executing, and then may not re-launch the process. As shown, content item process 624 stops executing at a subsequent time after time 642. This is noted in description box 662, which indicates that an existing process is not terminated when virtual machine instance resources are being consumed above an upped threshold. Thus, the above described techniques may allow the user experience to be improved, for example by not unnaturally terminating content item processes, while at the same time allowing content item processes to execute within desired resource (e.g., processor, memory, etc.) consumption ranges.

Figure 7:
FIG. 7 is a diagram illustrating examples of content item process reuse and recycling that may be used in accordance with the present disclosure.

As set forth above, in some examples, content item processes may periodically report their health status, for example to process monitoring components such as process watchers 222A-N of FIGS. 3-4. As also set forth above, in some examples, Also, in some examples, when a content item session that executes on a particular content item process has stopped execution, a determination may be made as to whether the content item process is healthy. If the content item process is unhealthy, the content item process may be terminated. By contrast, if the content item process is healthy, then the content item process may remain active and may be reused by executing one or more subsequent content item sessions. Referring now to FIG. 7, some examples of content item process reuse and recycling will now be described in detail. In particular, an example 700A of content item process reuse is shown at the top of FIG. 7. As shown, a content item process 701 executes a content item session 711, which eventually stops executing at a time 721. Additionally, at a determination is made that, at the time that session 711 stops executing, content item process 701 is healthy. Thus, when session 711 stops executing, it can be determined that process 701 is both healthy and is available to accept new a content item session. Based on this information, a determination is made to reuse content item process 701 in order to launch and execute a new content item session 712. By reusing healthy processes, at least part of content item data that was loaded for use with prior content item session 711 may be reused for subsequent content item session 712 without having to be reloaded. This reused content item data may include, for example, map or other virtual location data, game asset data, character data, and other content item data. This may reduce the wait time required for launching of the subsequent content item session 712.

Additionally, an example 700B of content item process recycling is shown at the bottom of FIG. 7. As shown in process recycling example 700B, a content item process 751 executes a content item session 761, which eventually stops executing at a time 771. Additionally, a determination is made that, at the time that session 761 stops executing, content item process 751 is unhealthy. Thus, although content item process 751 is available to accept new content item sessions after session 721 stops executing, a determination is nevertheless made to terminate content item process 721 because it is unhealthy. Accordingly, a new content item process 752 is launched to replace unhealthy content item process 751, and a new content item session 762 is launched and executed in new content item process 752. By terminating unhealthy content item processes, the system may improve reliability and user experiences by identifying and resolving potential problems.

Figure 8:
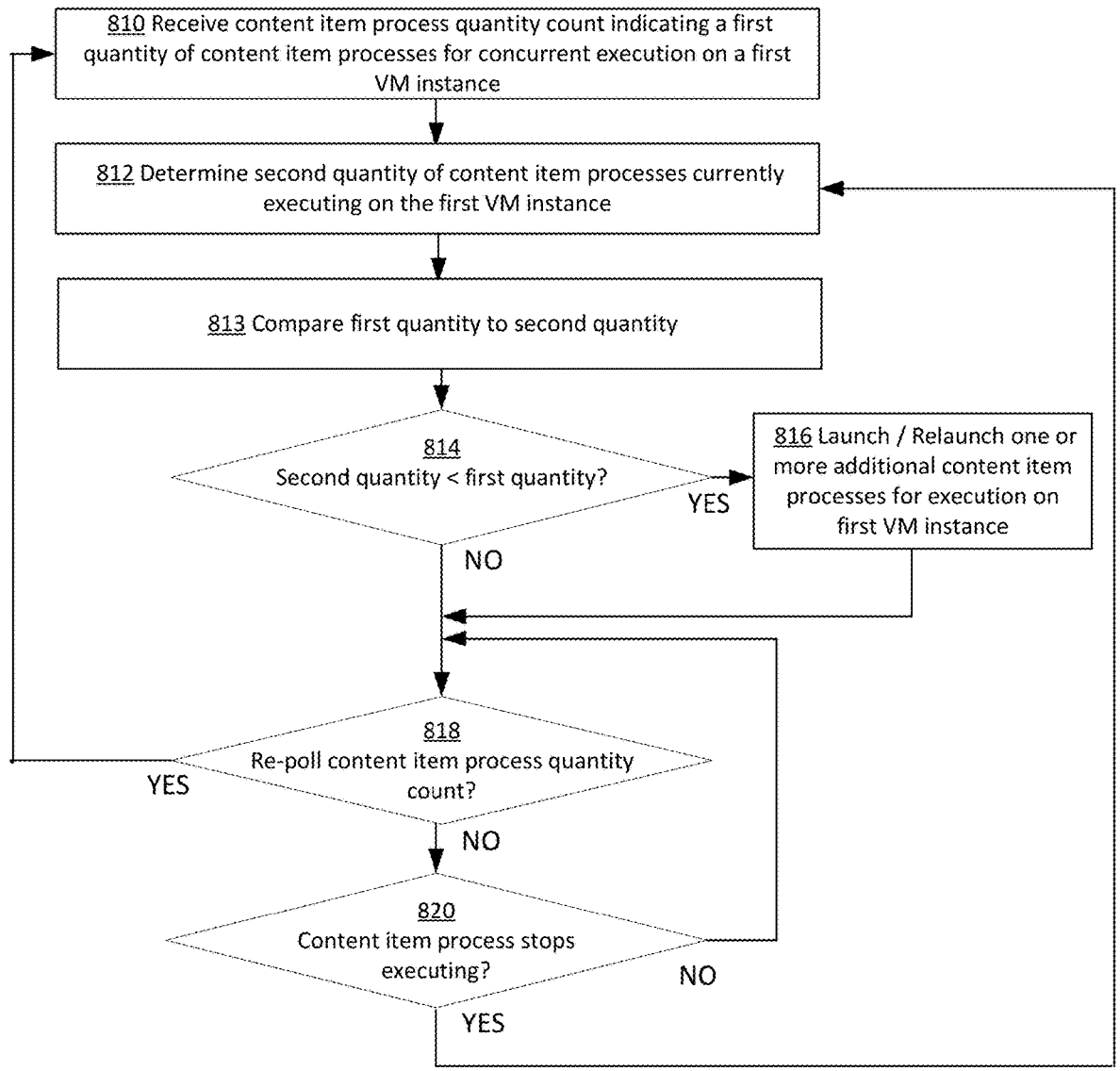
FIG. 8 is a flowchart illustrating an example process for concurrent execution of multiple content item processes on a single virtual machine instance that may be used in accordance with the present disclosure.

FIG. 8 is a flowchart illustrating an example process for concurrent execution of multiple content item processes on a single virtual machine instance that may be used in accordance with the present disclosure. As shown, the process of FIG. 8 initiates at operation 810, at which a content item process quantity count indicating a first quantity of content item processes for concurrent execution of content item sessions on a first virtual machine instance is received. For example, in some cases, the first virtual machine instance may receive the content item process quantity count by polling a component external to the first virtual machine instance, such as content management service 130 of FIG. 1. As set forth above, in some examples, the content item process quantity count may be provided by a developer or other customer of a computing service provider that hosts the content item processes. Additionally, in some examples, the content item process quantity count may be adjustable, for example based on performance metric and/or other information as described in detail above. The first virtual machine instance may, in some cases, periodically poll an external component in order to receive adjustments to the content item process quantity count.

At operation 812, a second quantity of content item processes that are currently executing on the first virtual machine instance may be determined. For example, the first virtual machine instance may include process monitoring components, such as process watchers 222A-N of FIGS. 304, which may be notified when content item processes are launched and stop executing.

At operation 813, the first quantity of content item processes (i.e., the quantity indicated by the content item process quantity count) is compared to the second quantity of content item processes (i.e., the quantity currently executing on the first virtual machine instance). At operation 814, it is determined whether the second quantity of content item processes is less than the first quantity of content item processes. If the second quantity of content item processes is less than the first quantity of content item processes, then, at operation 816, one or more additional content item processes are launched (or relaunched) for execution on the first virtual machine instance, for example until the first virtual machine instance is executing the first quantity of content item processes indicated by the content item process quantity count. For example, referring back to FIG. 5, it is shown that, at time 532 of example determination 500A, the content item process quantity count is increased from three to four. Additionally, at time 532, the first virtual machine instance launches an additional content item process (i.e., content item process 514) so as to increase its quantity of currently executing content item processes from three to four. If, at operation 814, it is determined that the second quantity of content item processes is not less than the first quantity of content item processes, then the process proceeds to operation 818 without launching additional content item processes for execution on the first virtual machine instance.

It is noted that the second quantity of content item processes may sometimes be determined to be greater than the first quantity of content item processes. This may sometimes occur, for example, when the content item process quantity count is decreased. However, as set forth above, existing content item processes are not terminated based on a reduction in the content item process quantity count. Rather, as will be described with respect to the remainder of the process of FIG. 8, decreases in the content item process quantity count may be handled by waiting for content item processes to stop executing and then not relaunching those processes (as opposed to intentionally terminating those processes).

At operation 818, it is determined whether a time has been reached to re-poll the content item processes quantity count. For example, in some cases, the first virtual machine instance may, at the expiration of a specified time interval, periodically re-poll an external source to determine whether the content item process quantity count has been adjusted. Upon expiration of such a time interval, the process may return to operation 810. By contrast, if the time interval has not yet expired, the process may proceed to operation 820, at which it is determined whether a content item process on the first virtual machine instance has stopped executing. As set forth above, process monitoring components executing on the first virtual machine instance may, in some examples, detect when a respective content item process has stopped executing. When no content item process stops executing, then the process loops back to operation 818.

When, at operation 820, it is detected that a content item process on the first virtual machine instance has stopped executing, then it is determined, based at least in part on the detecting, whether to relaunch the first content item process on the first virtual machine instance. In particular, the process returns to operation 812, at which the quantity of content item processes currently executing on the first virtual machine instance is updated to account for the content item process that has stopped executing. If, subsequent to detecting that the content item process has stopped executing, the second quantity of content item processes is less than the first quantity of content item processes, then, at operation 816, the content item process that stopped executing may be relaunched on the first virtual machine instance. By contrast, if, subsequent to detecting that the content item process has stopped executing, the second quantity of content item processes is not less than the first quantity of content item processes, then the content item process that stopped executing may not be relaunched on the first virtual machine instance. For example, referring back to FIG. 5, it is shown that, at time 542 of example determination 500B, the content item process quantity count is decreased from four to three. Additionally, subsequent to time 542, content item process 524 stops executing. When content item process 524 stops executing, there are three content item processes 521-523 executing on the virtual machine instance, and content item process 524 is, therefore, not relaunched.

Figure 9:
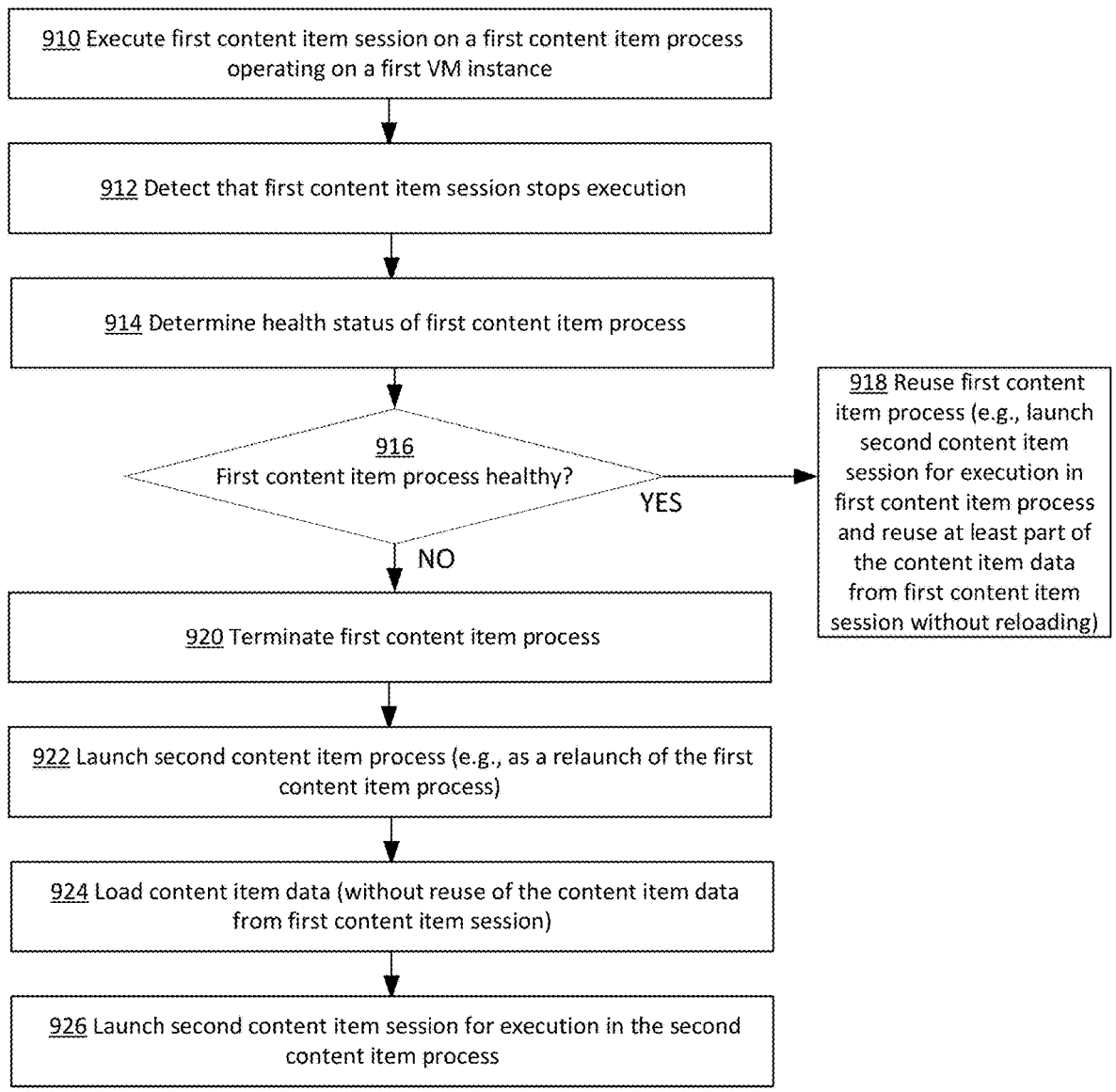
FIG. 9 is a flowchart illustrating an example process for content item session and content item process operation that may be used in accordance with the present disclosure.

FIG. 9 is a flowchart illustrating an example process for content item session and content item process operation that may be used in accordance with the present disclosure. As shown, the process of FIG. 9 initiates at operation 910, at which a first content item session is executed on a first content item process operating on a first virtual machine instance. For example, referring back to FIG. 7, it is seen that, in reuse example 700A, a first content item session 711 may execute on a first content item process 701, while, in recycling example 700B, a first content item session 761 may execute on a first content item process 751. At operation 912, it is detected that the first content item session stops execution. For example, content item session 711 stops execution at time 721, while content item session 761 stops execution at time 771. In some examples, process monitoring components, such as process watchers 222A-N of FIGS. 3-4, may detect when a content item session stops executing, for example based on information reported by a respective content item process.

At operation 914, a health status of the first content item process is determined. For example, at time 721, content item process 701 is determined to be healthy. By contrast, at time 771, content item process 751 is determined to be unhealthy. As set forth above, in some examples, the health of the first content item process may be determined based, at least in part, on receiving a communication from the first content item process within a specified time period. For example, a content item process may be required to periodically confirm its health to (or otherwise communicate with) a respective process monitoring component (e.g., process watchers 222A-N of FIGS. 3-4) within a specified time period. In some examples, the content item process may be considered healthy, for example, when it confirms its health or otherwise communicates within the specified time period. By contrast, in some examples, the content item process may be considered unhealthy when it prematurely stops executing (e.g., crashes) and/or when it fails to confirm its health or otherwise communicate within the specified time period.

At operation 916, if the first content item process is determined to be healthy, the process proceeds to operation 918, at which the first content item process is reused. In particular, the first content item process may be reused by launching a second content item session for execution in the first content item process. For example, as shown in reuse example 700A, a second content item session 712 is launched for execution in the first content item process 701. Additionally, as part of reusing the first content item process, at least part of content item data from the first content item session 711 may be reused for the second content item session 712 without being reloaded by the first content item process 701. This reused content item data may include, for example, map or other virtual location data, game asset data, character data, and other content item data. The reuse of the content item data may reduce the wait time required for launching of the second content item session 712. Additionally, in some examples, it may be desirable for the first content item process 701 to load certain additional portions of content item data, such as certain map or other virtual location data, that have been recently changed or updated, for example subsequent to the loading of the content item data for use with the first content item session 711. Thus, it is not required that the content item process must reuse all of the content item data from the first content item session 711.

If, at operation 916, the first content item process is determined to be unhealthy, the process proceeds to operation 920, at which the first content item process is terminated. For example, as shown in recycling example 700B, first content item process 751 is terminated after it is determined to be unhealthy at time 771. At operation, 922, a second content item process is launched, for example as a relaunch of the terminated first content item process. For example, second content item process 752 is launched after termination of first content item process 751. In some examples, second content item process 752 may be considered to be a re-launch of first content item process 751. At operation, 924, content item data is loaded by the second content item process. As should be appreciated, because, in this scenario, the first content item process has been terminated, content item data from the first content item session cannot be reused. Thus, operation 924 may include a reloading of much, if not all, of the content item data from the first content item session. At operation 926, the second content item session is launched for execution in the second content item process. For example, second content item process 762 is launched for execution in the second content item process 752.

Figure 10:
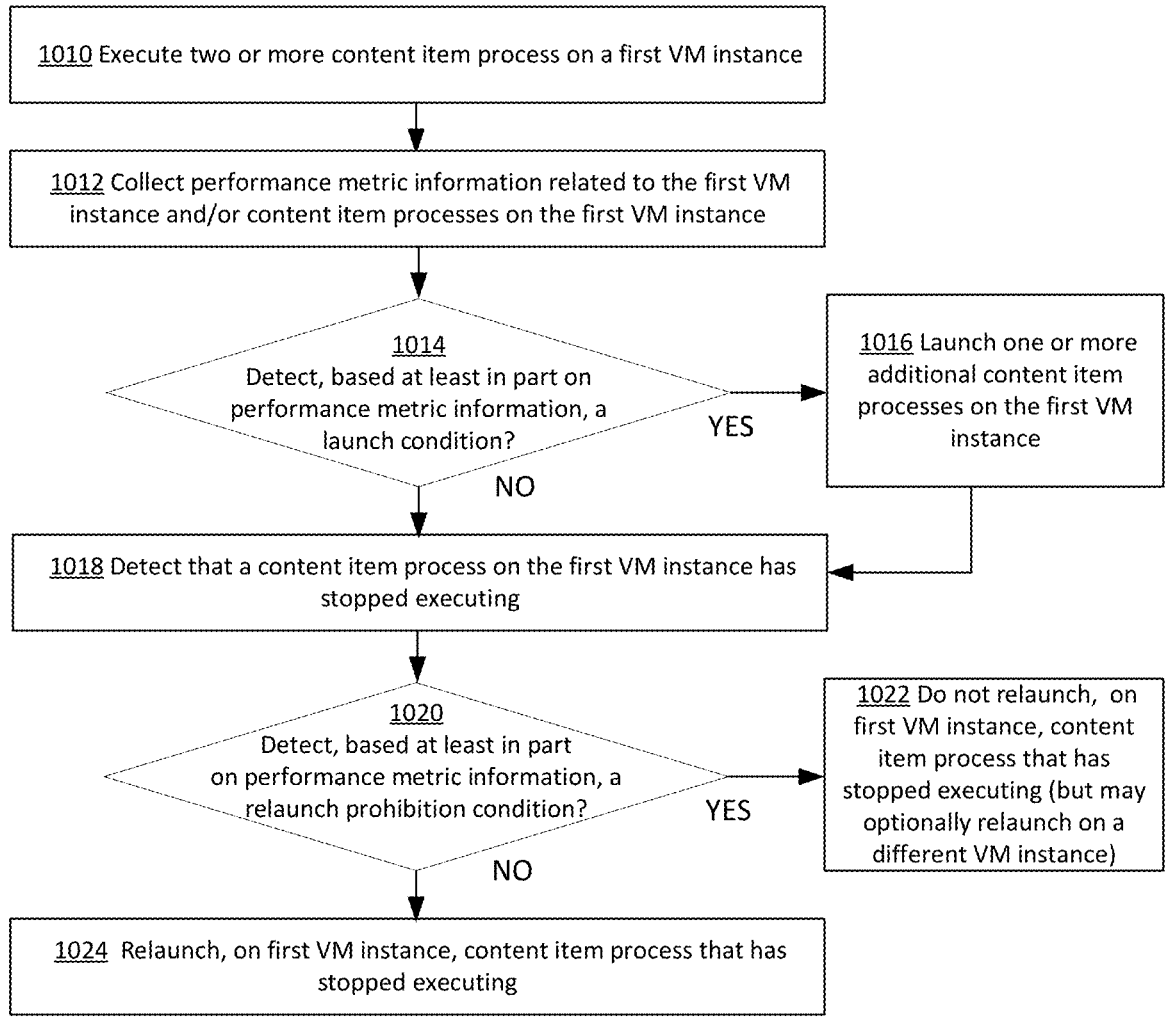
FIG. 10 is a flowchart illustrating an example process for scaling of content item processes that may be used in accordance with the present disclosure.

FIG. 10 is a flowchart illustrating an example process for scaling of content item processes that may be used in accordance with the present disclosure. As shown, the process of FIG. 10 initiates at operation 1010, at which two or more content item processes are executed on a first virtual machine instance. At operation 1012, performance metric information related to the first virtual machine instance and/or content item processes executing on the first virtual machine instance is collected, for example by proxy components 103 and/or content management services 130 of FIG. 1. As set forth above, the performance metrics for which information is collected may include, for example, processing usage, memory usage, input/output (I/O) metrics, health metrics, user quantities, virtual location information, and elapsed content item session duration. Various techniques for collecting this information are described in detail above and are not repeated here.

At operation 1014, it is determined whether a condition associated with launching of an additional content item process on the first virtual machine instance (referred to in FIG. 10 and hereinafter as a launch condition) is detected. As set forth above, in some examples, detection of a launch condition may include determining that the performance metric information indicates that the content item processes executing on the first virtual machine instance are consuming virtual machine instance resources at or below one or more lower thresholds, such as lower processor and/or memory usage thresholds. This may indicate that resources of the virtual machine instance are being unnecessarily wasted. Additionally, in some examples, detection of a launch condition may include determining that the content item processes executing on the first virtual machine instance are at or below a threshold level of associated players or other users. Additionally, in some cases, historical performance metric information may be maintained in associated with one or more content items, and the launch condition may be detected based, at least in part, on the historical performance metric information. In some cases, the historical performance metric information may indicate historical resource consumption in association with player quantities, virtual locations, elapsed content item session durations, and/or other metrics. For example, the historical performance metric information may indicate that a certain content item may have certain elapsed game session durations, certain map or other virtual locations, and/or other attributes that correlate to usage of smaller amounts of processor, memory, and/or other resources. In some examples, when content item processes on the first virtual machine instance report that they have one or more of these lower resource usage attributes, then a launch condition may be detected. As also set forth above, in some examples, a launch condition may be detected based on an increase in a content item process quantity count for the first virtual machine instance. If, at operation 1014, a launch condition is detected, then, at operation 1016, one or more additional content item processes are launched on the first virtual machine instance. By contrast, if, at operation 1016, a launch condition is not detected, then the process proceeds to operation 1018 without launching one or more additional content item processes on the first virtual machine instance.

At operation 1018, it is detected that a content item process on the first virtual machine instance has stopped executing. At operation 1020, it is determined whether a condition is detected associated with prohibiting relaunching, on the first virtual machine instance, of the content item process that stopped executing (referred to in FIG. 10 and hereinafter as a relaunch prohibition condition). As set forth above, in some examples, detection of a relaunch prohibition condition may include determining that the performance metric information indicates that the content item processes executing on the first virtual machine instance are consuming virtual machine instance resources at or above one or more upper thresholds, such as upper processor and/or memory usage thresholds. This may indicate that the virtual machine instance is operating above capacity and may cause delays, errors, crashes and other problems. Additionally, in some examples, detection of a relaunch prohibition condition may include determining that the content item processes executing on the first virtual machine instance are at or above a threshold level of associated players or other users. Additionally, in some cases, the relaunch prohibition condition may be detected based, at least in part, on the historical performance metric information. For example, the historical performance metric information may indicate that a certain content item may have certain elapsed game session durations, certain map or other virtual locations, and/or other attributes that correlate to usage of larger amounts of processor, memory, and/or other resources. In some examples, when content item processes on the first virtual machine instance report that they have one or more of these greater resource usage attributes, then a relaunch prohibition condition may be detected. As also set forth above, in some examples, a relaunch prohibition condition may be detected based on a decrease in a content item process quantity count for the first virtual machine instance. If, at operation 1020, a relaunch prohibition condition is detected, then, at operation 1022, the content item process that stopped executing is not re-launched on the first virtual machine instance. It is noted, however, that the content item process may optionally be relaunched on a different virtual machine instance. In particular, in some examples, when a relaunch prohibition condition is detected, an additional virtual machine instance may be launched, based at least in part on the detecting of the relaunch prohibition condition, in order to relaunch the content item process on the additional virtual machine instance. In some examples, the additional virtual machine instance may be relaunched automatically based on the detecting of the relaunch prohibition condition. By contrast, if, at operation 1020, a relaunch prohibition condition is not detected, then, at operation 1024, the content item process that stopped executing is re-launched on the first virtual machine instance.

Figure 11:
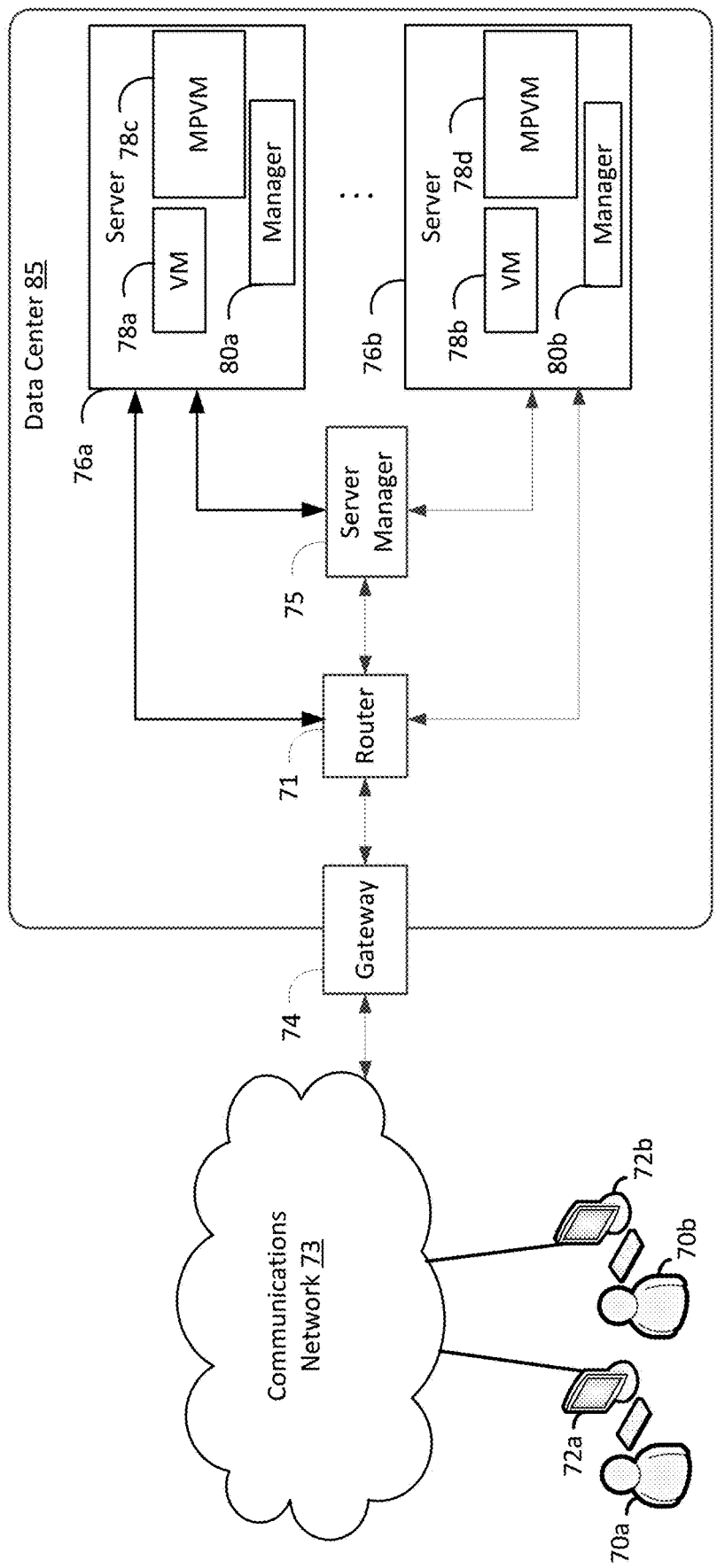
FIG. 11 is a diagram illustrating an example system for transmitting and providing data that may be used in accordance with the present disclosure.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are multiple process virtual machine ("MPVM") instances. The MPVM virtual machine instances 78c and 78d may be configured to perform all, or any portion, of the multiple content item process operation techniques and/or any other of the disclosed techniques in accordance with the present disclosure and described in detail above. As should be appreciated, while the particular example illustrated in FIG. 11 includes one MPVM virtual machine in each server, this is merely an example. A server may include more than one MPVM virtual machine or may not include any MPVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 11, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76a and 76b. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
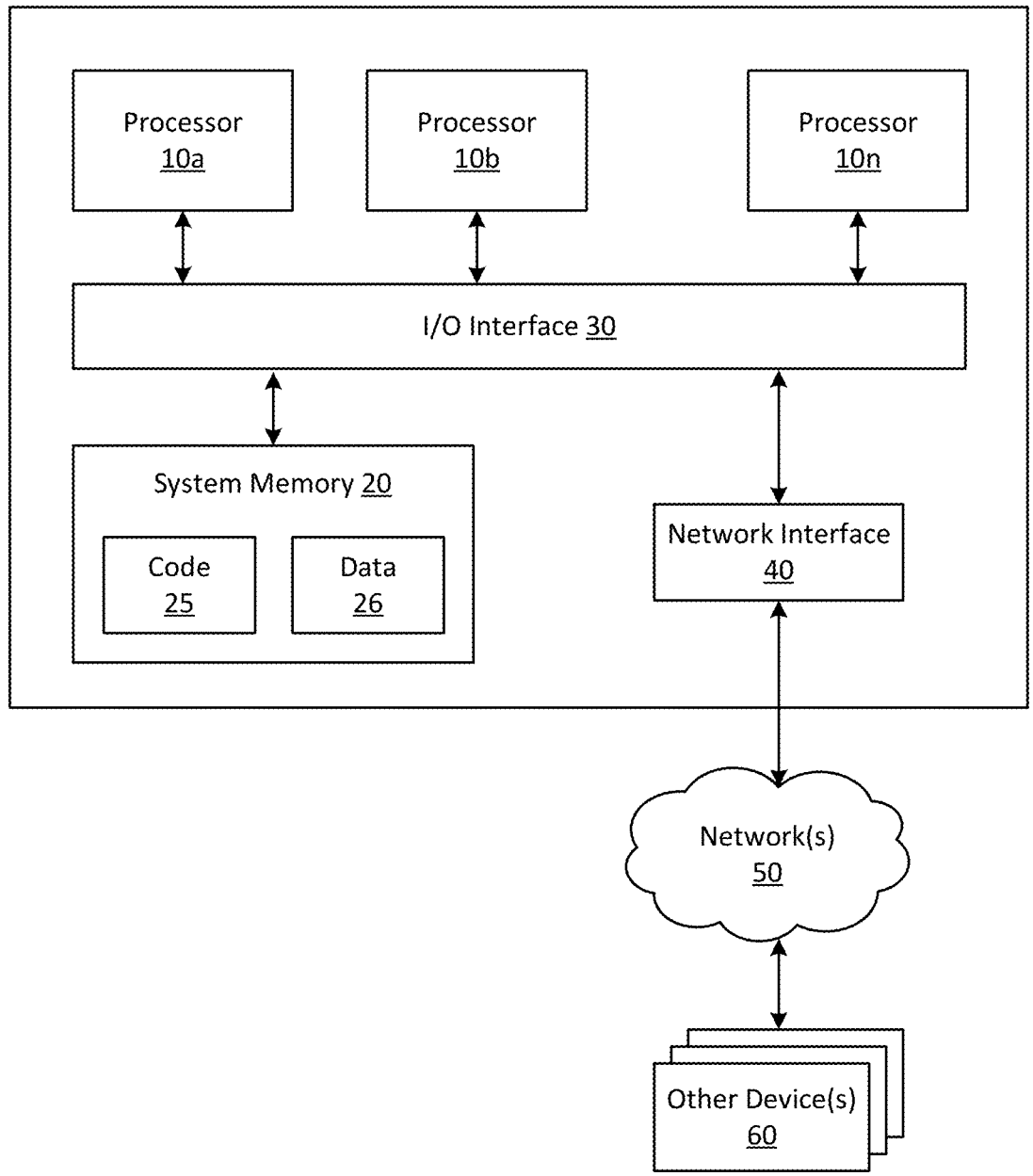
FIG. 12 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for video game process scaling comprising:
   one or more processors; and
   one or more memories having stored therein instructions that, upon execution by the one or more processors, cause the computing system perform operations comprising:
      executing two or more video game processes on a first virtual machine instance;
      collecting information associated with one or more performance metrics related to at least one of the first virtual machine instance or the two or more video game processes, wherein the one or more performance metrics comprise at least one of processing usage, memory usage, input/output metrics, health metrics, user quantities, virtual location information, or elapsed video game session duration;
      detecting, based at least in part on the information associated with the one or more performance metrics, a first condition associated with launching one or more additional video game processes, wherein the detecting of the first condition comprises determining that the information indicates that the two or more video game processes are consuming resources associated with the first virtual machine instance at or below one or more lower thresholds;
      launching the one or more additional video game processes on the first virtual machine instance, wherein the two or more video game processes and the one or more additional video game processes form a plurality of video game processes;

detecting, based at least in part on the information associated with the one or more performance metrics, a second condition associated with not relaunching, on the first virtual machine instance, a first video game process of the plurality of video game processes, wherein the detecting of the second condition comprises determining that the information indicates that the plurality of video game processes are consuming the resources associated with the first virtual machine instance at or above one or more upper thresholds, wherein the first virtual machine instance waits for the first video game process to stop executing after the detecting of the second condition, and wherein the first video game process is not relaunched on the first virtual machine instance when the first video game process stops executing;

determining, based on monitoring of the first video game process, when the first video game process stops executing on the first virtual machine instance; and relaunching the first video game process on a second virtual machine instance.

2. A computer-implemented method for content item process comprising:

executing two or more content item processes on a first virtual machine instance;

collecting information associated with one or more performance metrics related to at least one of the first virtual machine instance or the two or more content item processes, wherein the one or more performance metrics comprise at least one of processing usage, memory usage, input/output metrics, health metrics, user quantities, virtual location information, or elapsed content item session duration;

detecting, based at least in part on the information associated with the one or more performance metrics, a first condition associated with launching one or more additional content item processes, wherein the detecting of the first condition comprises determining that the information indicates that the two or more content item processes are consuming resources associated with the first virtual machine instance at or below one or more lower thresholds;

launching the one or more additional content item processes on the first virtual machine instance, wherein the two or more content item processes and the one or more additional content item processes form a plurality of content item processes;

detecting, based at least in part on the information associated with the one or more performance metrics, a second condition associated with not relaunching, on the first virtual machine instance, a first content item process of the plurality of content item processes, wherein the detecting of the second condition comprises determining that the information indicates that the plurality of content item processes are consuming the resources associated with the first virtual machine instance at or above one or more upper thresholds, wherein the first virtual machine instance waits for the first content item process to stop executing after the detecting of the second condition, and wherein the first content item process is not relaunched on the first virtual machine instance when the first content item process stops executing;

determining, based on monitoring of the first content item process, when the first content item process stops executing on the first virtual machine instance; and relaunching the first content item process on a second virtual machine instance.

3. The computer-implemented method of claim 2, further comprising maintaining historical information associated with the one or more performance metrics, wherein the detecting of the first condition is based, at least in part, on the historical information.

4. The computer-implemented method of claim 3, wherein the historical information indicates historical resource consumption in association with at least one of player quantities, virtual locations, or elapsed content item session durations.

5. The computer-implemented method of claim 2, wherein the detecting of the first condition is based in part on a quantity of content item processes for concurrent execution of content item sessions on the first virtual machine instance.

6. The computer-implemented method of claim 5, wherein the information associated with one or more performance metrics is used to adjust or override the quantity of content item processes for concurrent execution of content item sessions on the first virtual machine instance.

7. The computer-implemented method of claim 2, wherein the information associated with the one or more performance metrics is provided to a developer of the two or more content item processes.

8. The computer-implemented method of claim 2, wherein the second virtual machine instance is launched based, at least in part, on the detecting of the second condition.

9. One or more non-transitory computer-readable storage media having stored thereon instructions that, upon execution by one or more computing devices, cause the one or more computing devices to perform operations comprising:

executing two or more content item processes on a first virtual machine instance;

collecting information associated with one or more performance metrics related to at least one of the first virtual machine instance or the two or more content item processes, wherein the one or more performance metrics comprise at least one of processing usage, memory usage, input/output metrics, health metrics, user quantities, virtual location information, or elapsed content item session duration;

detecting, based at least in part on the information associated with the one or more performance metrics, a first condition associated with launching one or more additional content item processes, wherein the detecting of the first condition comprises determining that the information indicates that the two or more content item processes are consuming resources associated with the first virtual machine instance at or below one or more lower thresholds;

launching the one or more additional content item processes on the first virtual machine instance, wherein the two or more content item processes and the one or more additional content item processes form a plurality of content item processes;

detecting, based at least in part on the information associated with the one or more performance metrics, a second condition associated with not relaunching, on the first virtual machine instance, a first content item process of the plurality of content item processes, wherein the detecting of the second condition comprises determining that the information indicates that the plurality of content item processes are consuming the resources associated with the first virtual machine instance at or above one or more upper thresholds, wherein the first virtual machine instance waits for the first content item process to stop executing after the detecting of the second condition, and wherein the first content item process is not relaunched on the first virtual machine instance when the first content item process stops executing;

determining, based on monitoring of the first content item process, when the first content item process stops executing on the first virtual machine instance; and relaunching the first content item process on a second virtual machine instance.

10. The one or more non-transitory computer-readable storage media of claim 9, further comprising maintaining historical information associated with the one or more performance metrics, wherein the detecting of the first condition is based, at least in part, on the historical information.

\* \* \* \* \*